Figure 1:
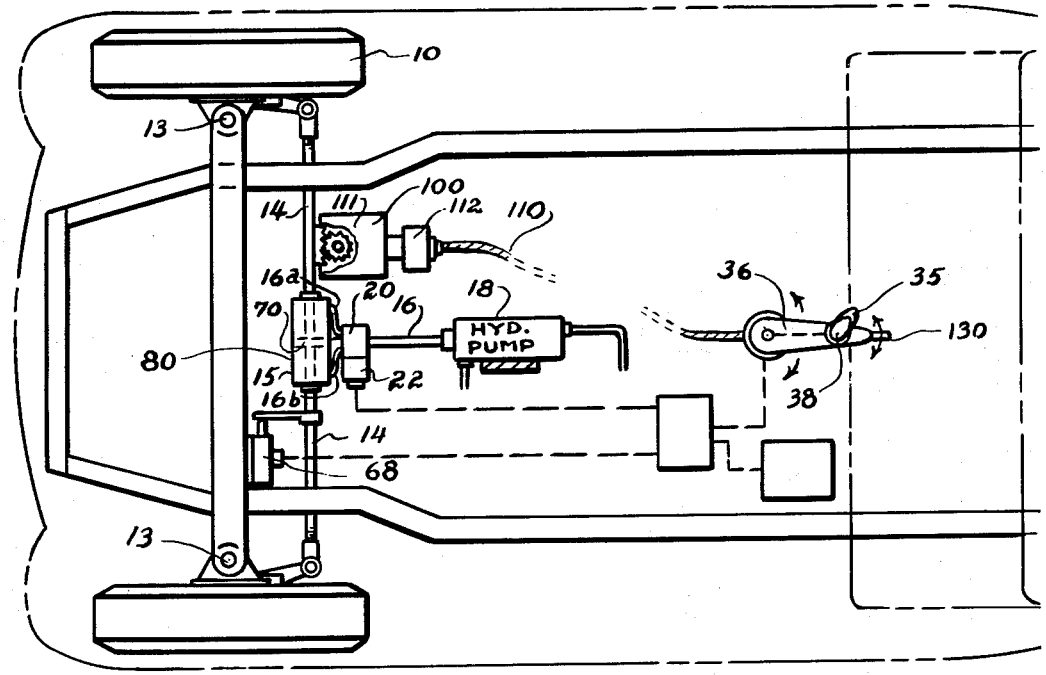

INVENTOR.
RUDY J. HART

United States Patent Office 3,256,951
Patented June 21, 1966

3,256,951
POWER STEERING FOR A MOTOR VEHICLE
Rudy J. Hart, 2431 Bethel Drive, Anaheim, Calif.
Filed Aug. 19, 1963, Ser. No. 302,986
8 Claims. (Cl. 180—79.2)

This invention relates to vehicle steering systems, and more specifically sets forth an improved vehicle hand steering device which will be both power and manually actuable.

Power steering controls for vehicles such as automobiles are well known. Such devices, however, generally suffer from several common disadvantages. For example, they are complicated and inefficient. Further, they are not easily adaptable to the automatic pilot control mechanisms which will soon be commercially available on certain highways to automatically pilot a vehicle without driver attention. Although several electronic mechanisms have been designed for the immediately above-described purpose, none are satisfactory. This is especially so in that they are not fail-safe. Thus, if the electronic portion of the control system is for some reason made inoperative, the driver of the vehicle will have no manual control to govern the direction of movement of the vehicle.

Additionally, the prior devices are either slow in response, or over-responsive in that the wheels of the vehicle will tend to hunt or overshoot the desired position. Such devices are not directly and immediately responsive to the rate of change of the steering control as, for example, would be a manual system.

It will be understood that although reference is made herein to a motor vehicle, such as an automobile, or the like, the device described and claimed herein will be equally applicable to any other system wherein similar controls are desirable.

It is further to be observed that present automobile steering controls involve the use of a steering wheel on a post in front of the driver. This is not the most desirable form of control possible. It has been established that one of the major causes of serious injury in motor vehicles during an accident impact is the impinging of such a wheel against the driver of the vehicle. Furthermore, the position of such steering wheels does not lend itself for quick turning as in an emergency nor is it restful for the hands of the driver. It has long been established that a control grip mechanism rotating in perhaps a horizontal plane and actuable in great arcs by only one hand of the driver, is a more desirable type of mechanism.

It is a cardinal object of this invention, therefore, to set forth an improved power control steering mechanism for motor vehicles.

It is another primary object to describe a direction control system for motor vehicles that will be fail-safe in that if the power system should become inoperative, a manual steering system connected to the same driver control arm will automatically become effective.

Another object and accomplishment of this device is a power control system for steering vehicles that will be easily adaptable to the presently known means to be installed in roadways to define and control the path of vehicles.

A still further purpose and accomplishment of the device described herein is to set forth a power steering mechanism that will be responsive to both the position and rate of change of the steering control and which will not have a tendency to hunt, thereby insuring smooth and safe operation.

An ancillary object and accomplishment of this invention is the provision of a power steering mechanism that may be controlled by a pistol grip type bar which may be rotated as in a horizontal plane.

Additionally, the invention set forth in the specification hereinafter, describes a system as above-described that will maintain the vehicle wheels in a desired position in that any displacement or deviation of the wheels from the said desired position will build up a counter balancing force in the control system.

Further, the invention herein will be easily adaptable to the present vehicle designs and will not entail major revision in the concepts of automobile construction.

The invention includes essentially a conventional hydraulic pump and cylinder suitably linked to control the wheels of the vehicle. The flow of hydraulic fluid into the cylinder is controlled by a valve whose opening is responsive to the position of a control grip type of handle suitably located for the driver. If the control above-mentioned should fail, a manual system including perhaps a flexible shaft connected to a mechanical linkage on the steering wheel arms, will automatically take over.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a plan view of the workings of the instant invention shown installed on an automobile frame with the parts illustrated primarily diagramatically.

Figure 2:
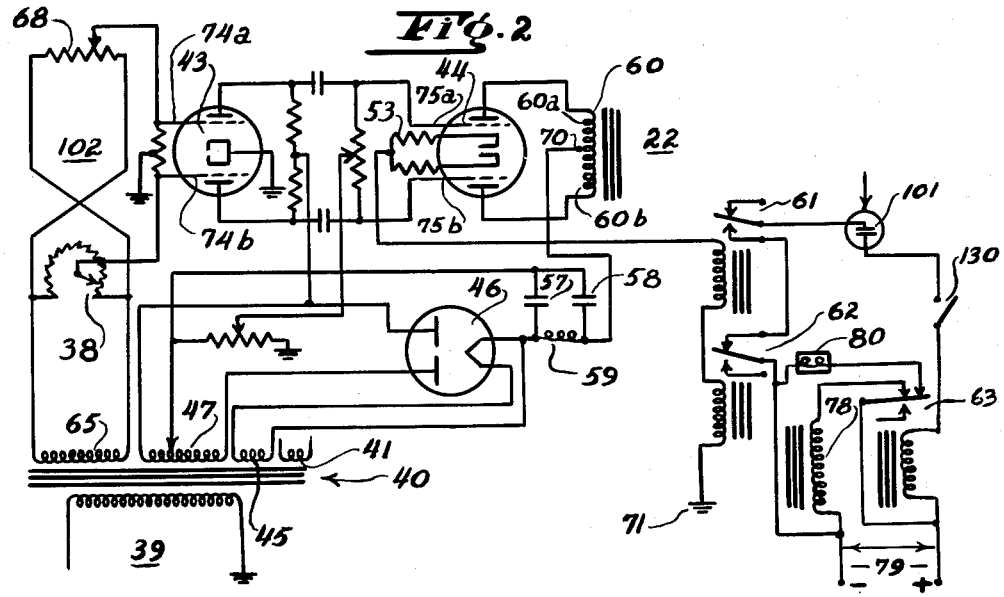

FIG. 2 diagramatically and schematically illustrates the electrical control circuit utilized in this device.

In the drawings, there are shown the front wheels 10 of a vehicle such as an automobile 11 or the like. It is to be noted that many of the details of construction of the automobile 11 are not described in that they are of no importance to the workings of the instant invention. The invention, as previously mentioned, may be utilized in conjunction with any type of vehicle or indeed, any device which should preferably have an automatic control mechanism.

The wheels 10 shown in the drawings are each rotatable about a kingpin 13 or the like, to control the path and direction of movement of the automobile 11. The instant invention provides the means for controlling the position of the wheels 10 and their rate of change of direction. As is common the wheels 10 are connected and controlled by a tie rod 14. Each position of the tie rod 14 will correspond to an angle of the wheels 10 relative to the direction of movement of the automobile 11.

Interposed either directly in the tie rod 14 or operably connected thereto, will be a power hydraulic cylinder 15 supplied with hydraulic oil under suitable pressure through lines 16 from a conventional hydraulic pump 18. The position of the operative portion or piston 70 (in phantom in FIG. 1) of the hydraulic cylinder 15 will control the position of the tie rod 14 and thus, the angle of the wheels 10. Details of the hydraulic cylinder 15 and the pump 18 are not set forth herein in that any of the conventional and well known devices for this purpose may be utilized.

A control valve 20 possibly of the poppet type will be utilized to direct the flow of hydraulic oil from the hydraulic pump into the hydraulic cylinder whereby the position of the piston 70 of the hydraulic cylinder 15 may be controlled. Thus, the control valve 20, by directing the oil under pressure (through line 16a) to one side of the hydraulic cylinder, will cause movement of the tie rod 14 in one direction. Should the control valve 20 direct oil under pressure (through line 16b) to the opposite side of the hydraulic cylinder 15, the tie rod 14 will move in the opposite direction. Of course, when the control valve 20 balances the flow of hydraulic oil at opposite ends of the hydraulic cylinder 15, the tie rods 14 will be held stationary.

As will be further described in detail hereinafter, the control valve 20 will be actuated by an electrical solenoid 22.

Connected to another portion of the tie rod 14 will be a variable resistor 68 in the form of a dashpot. The dashpot 68 is responsive to the position of the tie rod 14 and thus the wheels 10. It is utilized in the instant invention to vary the phase and amplitude of the A.C. voltage impressed across the input to the phase sensitive amplifier (to be described hereinafter) and potentiometer 38.

Referring particularly to FIG. 1, it is contemplated that the driver portion of this device will include a control grip handle 35 which may rotate on a control arm 36. The control grip handle 35 will be operatively connected to a potentiometer 38 of a control circuit, which will be described hereinafter. Sufficient to say at this time, however, that the position of the potentiometer 38 will control the position of the mechanism and finally, the wheels 10.

In FIG. 2, the control and power circuits to accomplish the same are shown primarily diagrammatically. The electric current from the vehicle low voltage alternating current source 39, such as an alternator or vibrator or any other source will be impressed across the primary coil of a transformer 40. The said transformer 40 will include a filament coil 41 which will supply power to the filaments of vacuum tubes 43 and 44 to be described. A second filament winding 45 will be connected to the rectifier tube 46 and a third winding 47 will supply the necessary power for the power supply to be described and for the tubes 43 and 44.

The tube 46 will function as a full wave rectifier to convert the A.C. voltage impressed across the coil 47 to a relatively high voltage direct current. This current, in turn, may be filtered by any conventional means such as, for example, by condensers 57 and 58 and choke coil 59. The output of this filter system will serve to supply the dual triode tube 44 of the amplifier control circuit through the central tap 70 of a coil 60 of the control valve solenoid 22.

The cathode 53 of the dual triode tube 44 will be connected to ground at 71 through the switching circuit which permits the control to operate only so long as the available current is between the desired maximum and minimum value. This circuit will include relays 61 and 62 which are open only if the current is less than minimum (relay 61) and open if the current exceeds a maximum (relay 62). These relays are shown in FIG. 2 in their open position as if there had been a malfunction. It will be apparent that upon opening of either of the relays 61 or 62, relay 63 will accordingly open, causing a circuit to be formed through coil 78 which will comprise one portion of a solenoid controlling a magnetic clutch 112, to be described hereinafter. The circuit will be completed through a separate twelve volt power supply 79. The coil 78 when actuated by any malfunction may further serve to open a hydraulic bypass valve 80 at the cylinder 15 so that hydraulic back pressure in the piston itself would not have to overcome when it is desired to turn the wheels manually.

This fail-safe circuit portion will also include a pressure switch 101 which will be held closed by hydraulic pressure from the pump 18. The said pressure switch 101 must be closed in order to maintain switch 63 in its desired position whereby coil 78 will not receive a flow of current. Should the pressure on switch 101 fall below the minimum, the said switch will open allowing relay 63 to move to the position shown in FIG. 2 causing current to flow through coil 78.

Transformer 40 through a coil 65 will supply voltage to the potentiometer circuit 102. This circuit will include the potentiometer 38 actuated by movement of the control grip handle 35. The opposite portion of the circuit will be comprised of the dashpot resistor 68.

Thus, rotation of the control grip handle 35 will alter the phase and amplitude of the voltage applied to a grid 74a of the dual triode tube 43. This, of course, will result in a change in the signal applied to the grid 75a of the tube 44. The resulting amplified signal from the tube 44 will be conducted through one portion 60a of the solenoid 22 coil 60. This, in turn, will cause the solenoid 22 to move, in turn opening a port of the attached control valve 20. The change in flow of hydraulic oil will cause the hydraulic cylinder 15 to move in one direction thereby effecting rotation of the wheels 10.

As the wheels turn, however, the dashpot will cause a change in the variable resistor 68.

As will be seen in FIG. 2, this will result in a change in the voltage in the other half (68) of the potentiometer circuit 102. This said voltage is applied to the tube 43, and will be amplified in tube 44. The amplified signal will, in turn, be applied to the opposite portion 60b of the solenoid coil 60. As a result, the flow of current through each of the two halves of this coil 60 are balanced only when the wheels 10 have rotated to a position dictated by the control grip 35 movement. Of course, it will be realized that the operations above-described will function instantaneously so that the position of the wheels 10 is instantaneously altered relative to any change in the control grip 35 position.

Of course, the specific amplifier and voltage dividers above set forth are merely for exemplary purposes, and any well known equivalents may be substituted therefor.

As shown in FIG. 1, the control arm 36 may pivot and thus rotate for example a flexible shaft 110, which will activate a mechanical linkage 111 through a magnetic clutch 112.

As mentioned hereinabove, the magnetic clutch will be automatically actuated by coil 78 should there be any failure or malfunction of either the electric current or hydraulic oil systems. In such event, the control arm 36 will be operatively connected to the tie rods 14 through the mechanical linkage 111 so that the manual control of the steering wheel may be affected.

Additionally, in the event of failure as mentioned heretofore, the bypass valve 80 will open so that the tie rods 14 may move without the necessity of overcoming hydraulic oil back pressure.

If desired, a separate switch 130 may be supplied for the operator's convenience to at any time activate the magnetic clutch 112 as well as the hydraulic bypass valve 80. Such a switch may be located on the pedestal adjacent the pivot arm 36. The operator may then elect to utilize the manual system merely by actuating said switch. The system will then remain in manual until the operator elects to return to the automatic system.

The micro-switch 130 while maintained in the closed position will allow the completion of the circuit through relay 61 and pressure switch 101 and will thereby maintain switch or relay 63 in its desired position, whereby the coil 78 will not receive a flow of current. Releasing the micro-switch 130 will, in turn, release the relay 63 thereby allowing transfer of the system to "manual" operation as previously described. Normally in "automatic" position, relay 63 will be held down whereby there will be no completed circuit through the solenoid 78 or through the bypass solenoid 80.

If desired, the micro-switch 130 will be mounted as a detent under the control arm 36. When it is desired to transfer to "manual" operation for any reason, the control arm 36 will be raised off the detent. This will allow micro-switch 130 to open and will thereby break the holding solenoid circuit and insure the transfer of the relay 63 to the "manual" position. Thus, it will be seen that any improper wheel displacement may be instantly corrected merely by moving the control arm off the detent thereby allowing manual control of the said wheel.

This will serve as an automatic safety device and will operate in a manner more efficient than any prior unit. The safety of the unit, insured by the instantaneous transfer from "automatic" to "manual" is an especially important feature of this device.

The device may be adapted for automatic guidance systems merely by providing an electrical pickup across the potentiometer circuit 102 in place of the potentiometer 38. Deviations of signal will then be sensed by the pickup, changing direction until balance is restored.

It is therefore seen that there is above-described a device for accomplishing all of the objects and accomplishments previously set forth. The device is safe, efficient, useful and easily adaptable. Of unique importance is the fail-safe feature wherein manual control of steering will instantaneously and automatically be affected should there be malfunction of the primary portions of the device.

While there are above disclosed but a limited number of embodiments of the structure and product of the invention herein presented, it is possible to produce still other embodiments without departing from the inventive concepts herein disclosed, and it is desired, therefore, that only such limitations be imposed on the appended claims as are stated therein, or required by the prior art.

Having thus described my invention and illustrated its use, what I claim as new and desire to secure by Letters Patent is:

1. An apparatus for controlling the direction of wheels of a motor vehicle comprising:
   a manual control system having a control arm arcuate about a first axis, mechanical means linking said arm to said wheels to effect their angular displacement upon arcuate movement of said arm;
   a power control system having a hand control grip on said arm rotatable about a second axis eccentric to said first axis, error signal generating means responsive to movement of said control grip about said second axis, motive power means, means responsive to said error signal to apply said motive power means to said wheels to effect the angular displacement of said wheels and fail safe means to automatically disconnect said power means in the event of malfunction in said power control system.

2. The apparatus of claim 1 wherein said means to apply said motive power means comprises induction means activated by an error signal and said fail safe means is responsive to the current drain through said induction means to disconnect said power control system when said current exceeds a predetermined maximum.

3. The apparatus of claim 2 wherein said fail safe means is responsive to disconnect said power control system when said current through said induction means is less than a predetermined minimum.

4. The apparatus of claim 1 wherein said motive power means comprises a hydraulic pump and said means to apply said power means to said wheels comprises a hydraulic circuit with valve means responsive to said error signal and wherein said fail safe means includes means responsive to the hydraulic pressure to disconnect said power control system when said hydraulic pressure is less than a predetermined minimum.

5. The apparatus of claim 1 including manually actuated switch means to engage and to disengage said power control system.

6. The apparatus of claim 5 wherein said switch means comprises a defent positioned in the arcuate path of said control arm about said first axis to permit said arm to depress said switch and engage said power control system.

7. The apparatus of claim 1 wherein said first axis is medially positioned on said vehicle.

8. The apparatus of claim 1 wherein said error signal generating means comprises alternating current reference signal generating means, a steering signal generator for developing across its output terminals a steering signal voltage, a wheel position signal generator for developing across its output terminals a wheel position signal voltage, means to compare said signals and means to generate an error signal with a phase shift and amplitude responsive to the net difference in said signals, means to generate a direct current corrective voltage having a polarity and magnitude corresponding to the phase shift and amplitude of said error signal; and wherein said means to apply said motive power means is responsive to said corrective voltage.

References Cited by the Examiner
UNITED STATES PATENTS

| | | | |
|---|---|---|---|
| 2,754,465 | 7/1956 | Brier | 180—79.1 X |
| 2,820,872 | 1/1958 | Carr | 180—79.1 X |
| 2,957,535 | 10/1960 | Helgeson | 180—79.2 |
| 2,962,108 | 11/1960 | Bidwell | 180—79.2 |
| 3,009,525 | 11/1961 | De Liban | 180—82 |
| 3,022,850 | 2/1962 | Bidwell et al. | 180—79.2 X |

KENNETH H. BETTS, *Primary Examiner.*

BENJAMIN HERSH, *Examiner.*

R. C. PODWIL, *Assistant Examiner.*